United States Patent
Andrews et al.

(10) Patent No.: US 8,881,218 B2
(45) Date of Patent: Nov. 4, 2014

(54) VIDEO TRANSMISSION WITH ENHANCED AREA

(75) Inventors: Carlton Andrews, Austin, TX (US); Roy W. Stedman, Austin, TX (US)

(73) Assignee: Dell Products L.P., Round Rock, TX (US)

(*) Notice: Subject to any disclaimer, the term of this patent is extended or adjusted under 35 U.S.C. 154(b) by 338 days.

(21) Appl. No.: 13/229,145

(22) Filed: Sep. 9, 2011

(65) Prior Publication Data

US 2013/0067524 A1 Mar. 14, 2013

(51) Int. Cl.
*H04N 7/173* (2011.01)
*H04N 21/2343* (2011.01)
*H04N 21/24* (2011.01)
*H04N 21/845* (2011.01)
*H04N 21/236* (2011.01)
*H04N 21/4728* (2011.01)

(52) U.S. Cl.
CPC .. *H04N 21/234363* (2013.01); *H04N 21/23614* (2013.01); *H04N 21/2402* (2013.01); *H04N 21/4728* (2013.01); *H04N 21/8456* (2013.01)
USPC ........... 725/116; 725/131; 725/139; 725/141; 725/146; 725/151

(58) Field of Classification Search
CPC ....................... H04N 21/23614; H04N 21/431
USPC ......... 725/116, 146, 114, 131, 133, 139, 141, 725/144, 151, 153
See application file for complete search history.

(56) References Cited

U.S. PATENT DOCUMENTS

| | | | |
|---|---|---|---|
| 7,630,549 B2* | 12/2009 | Aharon et al. | 382/173 |
| 2003/0235338 A1* | 12/2003 | Dye | 382/232 |
| 2004/0032906 A1* | 2/2004 | Lillig | 375/240.08 |
| 2007/0035615 A1* | 2/2007 | Kung | 348/14.08 |

* cited by examiner

*Primary Examiner* — Farzana Hossain
(74) *Attorney, Agent, or Firm* — Haynes and Boone, LLP (57) ABSTRACT

A video transmission method includes receiving a selected area from an input device. The selected area includes a first portion of a video image received from a video device. The video image includes a second portion, at least some of which is not included in the selected area. The first portion of the video image is transmitted at a first resolution over a network for display. The second portion of the video image is transmitted at a second resolution over the network for display. The second resolution is lower than the first resolution, which allows the system and method to utilize available transmission bandwidth to transmit the video image with the first portion, which may be a portion of interest in the video image, at a higher quality than the second portion, which may be a portion in the video image of less interest than the first portion.

20 Claims, 9 Drawing Sheets

FIG. 8

VIDEO TRANSMISSION WITH ENHANCED AREA

BACKGROUND

The present disclosure relates generally to information handling systems (IHSs), and more particularly to a video transmission system for an IHS that includes a enhanced area.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs enable a variety of communications technologies that allow IHS users to communicate over great distances virtually instantaneously. For example, many IHS users communicate with each other using video transmission systems that transmit video data between the IHSs over a network to allow the IHS users to view each other as part of their communication. However, the transmission of video data using conventional video transmission systems suffers from several disadvantages.

Most conventional video transmission systems are limited by the fact that bandwidth for the transmission of video data between IHSs over a network may be limited, which can result in the video transmission system adjusting the quality of the video image presented on an IHS based on the capabilities of the video transmission link to that IHS. This is typically accomplished by the video transmission system adjusting the frame rate, the compression rate, the image resolution, and/or a variety of video characteristics of video images known in the art in an attempt to produce the best overall video image and frame response possible in light of the limitations of the video transmission link. For example, a video transmission between IHSs over a network may begin as a high definition video transmission. However, the video transmission link of at least one of the IHSs participating in the video transmission may be unable to maintain the video transmission speed (e.g., 1.2 Mpbs) and, in response, the video transmission system will reduce the resolution (or other video characteristics) of the entire video image in order to provide the best 'overall experience' possible in light of the limitations of the video transmission link (e.g., the resolution of the entire video image may reduced such that the video transmission link is capable of providing the video image at a minimum frame rate that has been deemed 'acceptable'). The quality of the video image provided in such situations is typically greatly reduced relative to a high definition experience (e.g., the video transmission may provide a standard definition video experience equivalent to that available from a Video Home System (VHS) tape video image.)

Accordingly, it would be desirable to provide an improved video transmission system.

SUMMARY

According to one embodiment, a method for transmitting video includes receiving a selected area from an input device, wherein the selected area comprises a first portion of a video image received from a video device, and wherein the video image includes a second portion and at least some of the second portion is not included in the selected area, transmitting the first portion of the video image at a first resolution over a network for display on a display device, and transmitting the second portion of the video image at a second resolution over the network for display on the display device, wherein the second resolution is lower than the first resolution.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
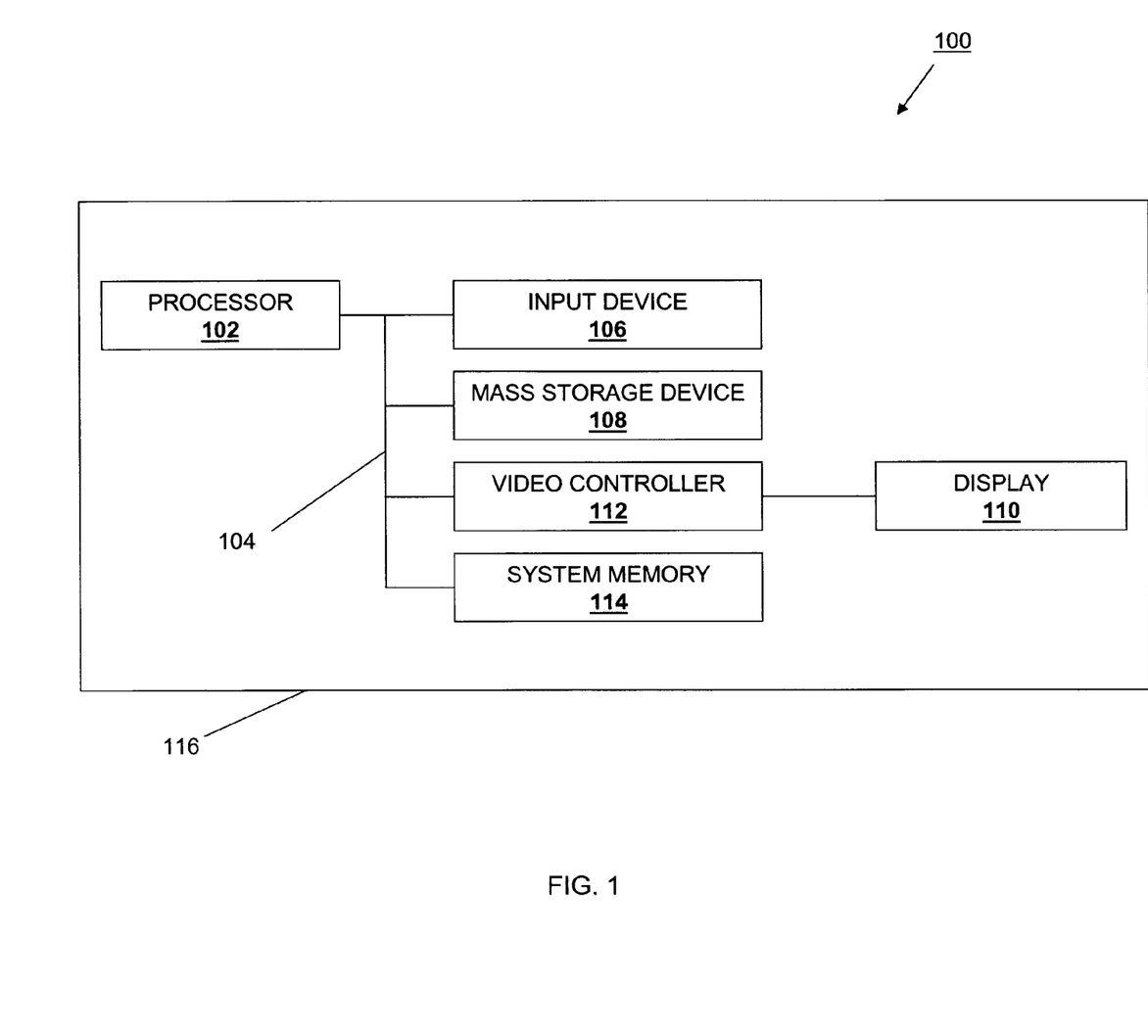
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
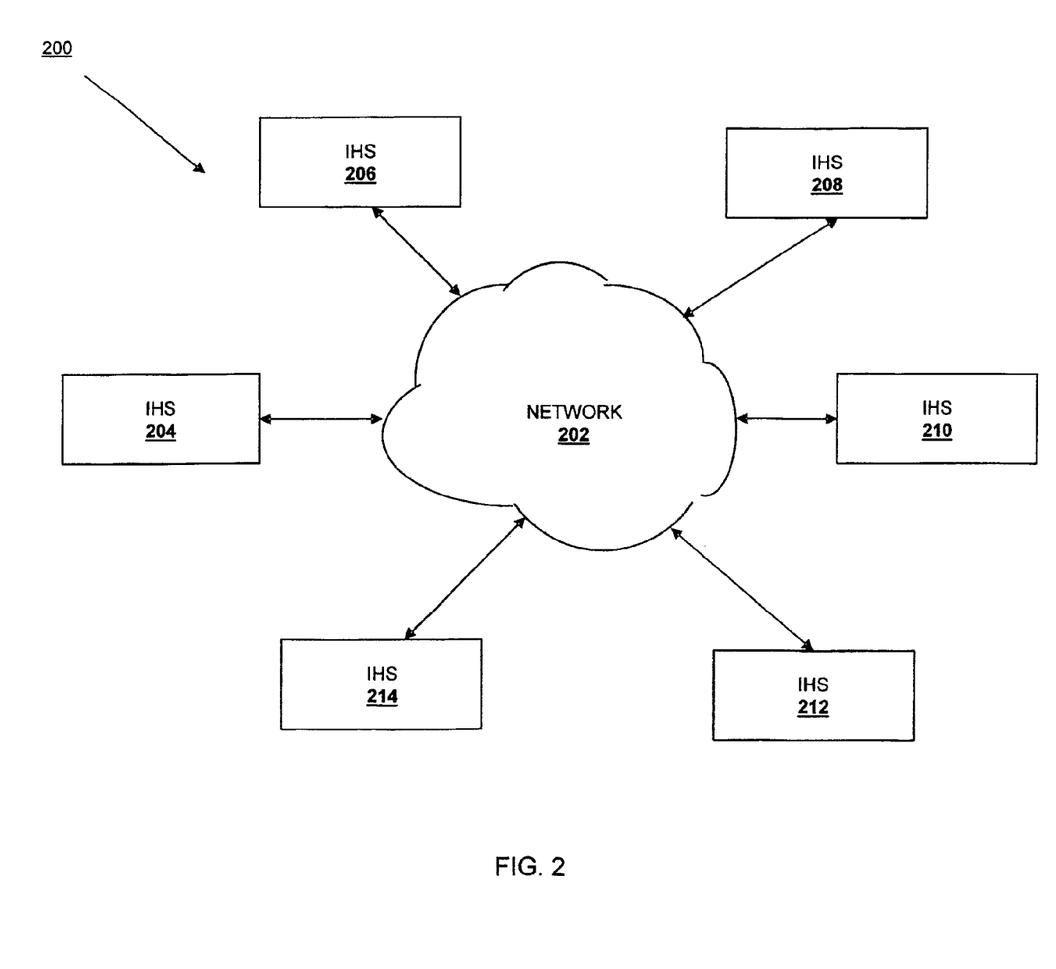
FIG. 2 is a schematic view illustrating an embodiment of a video transmission system.

Referring now to FIG. 2, a video transmission system 200 is illustrated. The video transmission system includes a network 202 coupling together a plurality of IHSs 204, 206, 208, 210, 212, and 214. In an embodiment, the IHSs 204, 206, 208, 210, 212, and 214 may each be the IHS 100, described above with reference to FIG. 1 and/or may each include some or all of the components of the IHS 100. In an embodiment, the network 202 may be an intranet, the Internet, and/or a variety of other networks known in the art. Each of the IHSs 204, 206, 208, 210, 212, and 214 includes a network interface that is coupled to a processor for communicating over the network 202. While six IHSs have been illustrated as being coupled together through the network 202, one of skill in the art will recognize that any number of IHSs may be coupled together through the network 202 in order to transmit video to and receive video from each other without departing from the scope of the present disclosure.

Figure 3:
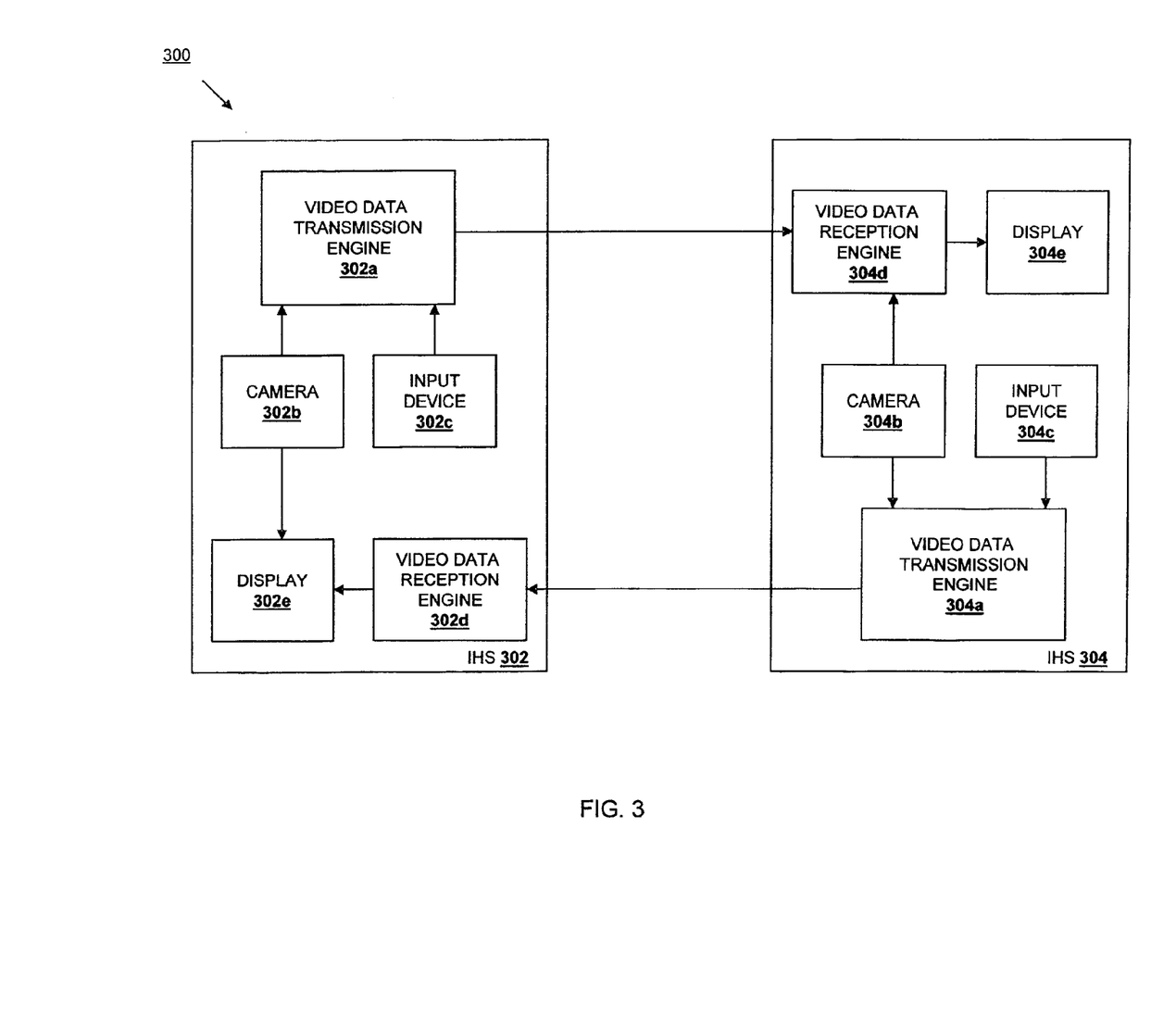
FIG. 3 is a schematic view illustrating an embodiment of a video transmission system.

Referring now to FIG. 3, a video transmission system 300 is illustrated. In an embodiment, the video transmission system 300 may be part of the video transmission system 200, described above with reference to FIG. 2. The video transmission system 300 includes an IHS 302 that may be any of the IHSs 204, 206, 208, 210, 212, and 214, discussed above with reference to FIG. 2. The video transmission system 300 also includes an IHS 304 that may be any of the IHSs 204, 206, 208, 210, 212, and 214, discussed above with reference to FIG. 2. Thus, the IHSs 302 and 304 may be coupled together through a network (e.g., the network 202, discussed above with reference to FIG. 2).

The IHS 302 includes a video data transmission engine 302*a* that is coupled to each of a camera 302*b* (or other video device) and an input device 302*c*. In an embodiment, the video data transmission engine 302*a* may be provided by instructions that are stored on a non-transitory, computer-readable medium (e.g., the system memory 114 in the IHS 100, the storage device 108 in the IHS 100, and/or a variety of other non-transitory, computer-readable mediums known in the art) that, when executed by a processor (e.g., the processor 102 in the IHS 100), cause the processor to perform a number of functions described in further detail below. The IHS 302 also includes a video data reception engine 302*d* that is coupled to a display 302*e* which is coupled to the camera 302*b*. In an embodiment, the video data reception engine 302*d* may be provided by instructions that are stored on a non-transitory, computer-readable medium (e.g., the system memory 114 in the IHS 100, the storage device 108 in the IHS 100, and/or a variety of other computer readable mediums known in the art) that, when executed by a processor (e.g., the processor 102 in the IHS 100), cause the processor to perform a number of functions described in further detail below. In an embodiment, the input device 302*c* may be the input device 106, and as discussed above with reference to FIG. 1 may include keyboards, touchscreens, pointing devices such as mouses, trackballs, and trackpads, and/or a variety of other input devices known in the art. In an embodiment, the input device 302*c* and the display 302*e* may be combined such as, for example, then the input device 302*c* is a touchscreen.

In an embodiment, the IHS 304 may be substantially similar in structure and operation to the IHS 302, and thus may include a video data transmission engine 304*a*, a camera 304*b*, an input device 304*c*, a video data reception engine 304*d*, and a display 304*e* that are substantially similar in structure and operation to the video data transmission engine 302*a*, the camera 302*b*, the input device 302*c*, the video data reception engine 302*d*, and the display 302*e*. As discussed above, the IHSs 302 and 304 are coupled together through a network (e.g., the network 202 of FIG. 2) and, in an embodiment, the coupling of the IHSs 302 and 304 couples the video data transmission engine 302*a* in the IHS 302 to the video data reception engine 304*d* in the IHS 304, while also coupling the video data transmission engine 304*a* in the IHS 304 to the video data reception engine 302*d* in the IHS 302, as illustrated in FIG. 3. In another embodiment, the coupling of the IHSs 302 and 304 over the network may couple the input device 302*c* of the IHS 302 to the video data transmission engine 304*a* of the IHS 304 and the input device 304*c* of the IHS 304 to the video data transmission engine 302*a* of the IHS 302.

Figure 4:
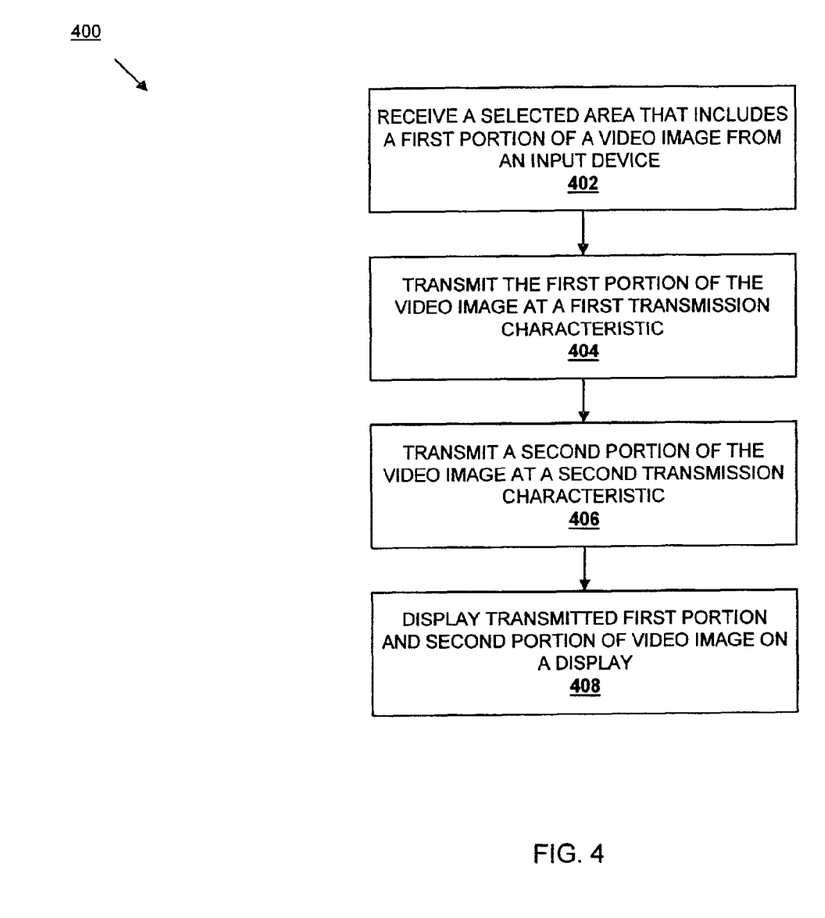
FIG. 4 is a flow chart illustrating an embodiment of a method for transmitting video.
Figure 5:
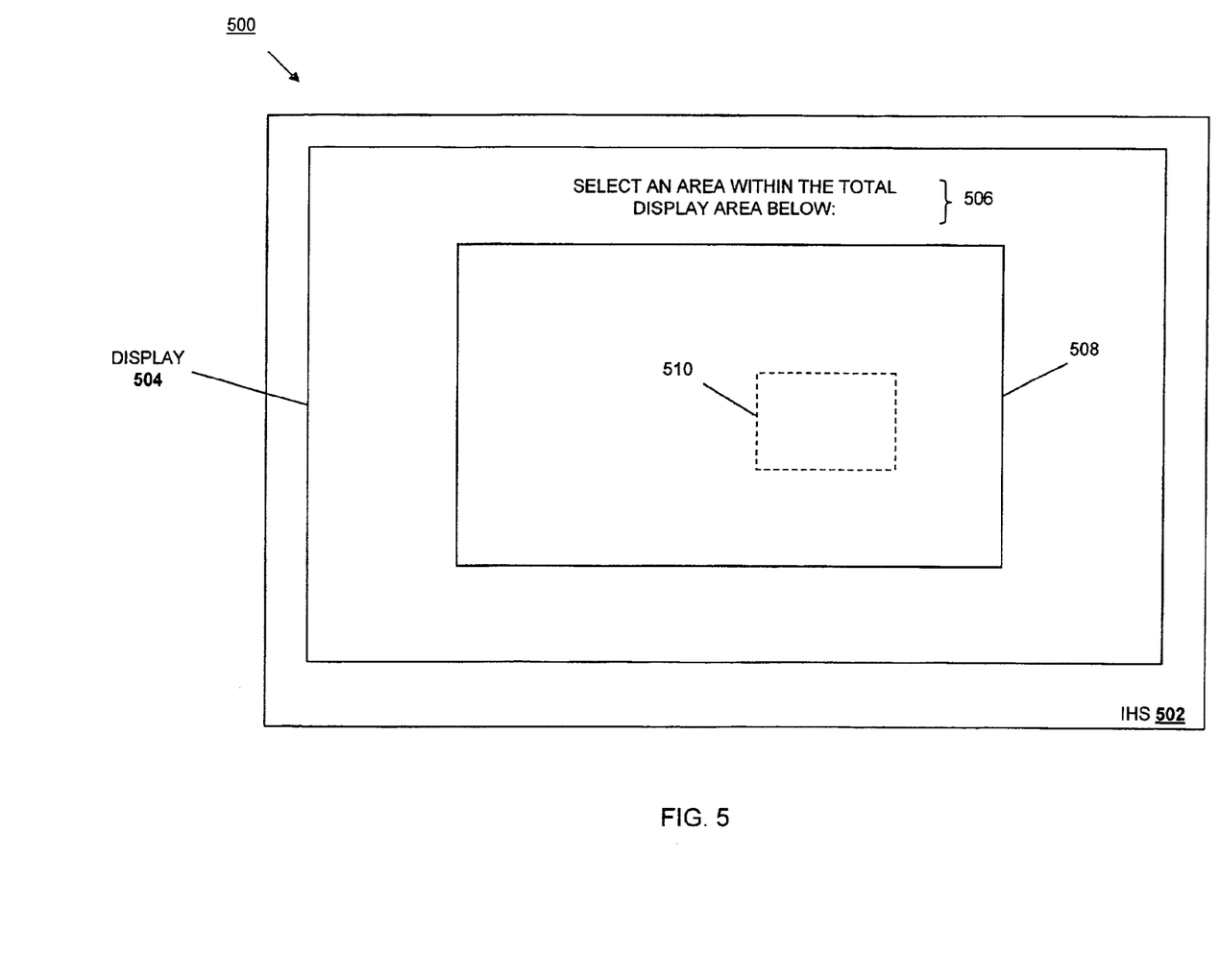
FIG. 5 is a front view illustrating an embodiment of an IHS used in a video transmission system and displaying an enhanced area selection screen.

Referring now to FIGS. 3, 4, and 5, a method 400 for transmitting video is illustrated. The embodiment of the method 400 described below is directed to a video conference performed between the IHSs 302 and 304 of FIG. 3. However, one of skill in the art will recognize that the method 400 may be performed to provide video conferencing functionality between any plurality of IHSs (e.g., one IHS transmitting video to a plurality of other IHSs, each of a plurality of IHSs transmitting video to and receiving video from each of the other IHSs, etc.), used for the "one-way" transmittal of stored video (e.g., video located on a storage device or retrieved over a network) from, for example, the IHS 302 to the IHS 304, and/or subject to a variety of other modifications known in the art involved with video transmission without departing from the scope of the present disclosure. The method 400 begins at block 402 where a selected area that includes a first portion of a video image is received from an input device.

In an embodiment, the IHS 302 may be a video transmitting IHS that is transmitting video to video receiving IHSs that include the IHS 304. An enhanced area selection screen 500 may be provided on a display 504 of an IHS 502 (e.g., the display 302*e* of the IHS 302 in this embodiment). The enhanced area selection screen 500 includes an selected area instruction 506 instructing the user of the IHS 502 to select an area within a total display area that is to be enhanced. The enhanced area selection screen 500 also includes a total display area 508. In an embodiment, the total display area 508 is received from a camera (e.g., the camera 302*b* in the IHS 302 is this embodiment) and includes the video image that is to be transmitted from the IHS 302 to the IHS 304 (e.g., the entire video image that is captured by the camera 302*b* or a substantial portion of that video image.) The user of the IHS 502 may then use an input device that is physically coupled to the IHS 502 (e.g., the input device 302c on the IHS 302 in this embodiment) to provide an enhanced area input that selects a selected area 510 within the total display area 508 that is a specific area of interest of the user in the video image. In an embodiment, the input device may be a mouse, trackpad, and/or other "point-and-click" device that may be used to provide the enhanced area input that selects the selected area 510 using methods known in the art (e.g., by drawing the selected area 510, selecting a point within the total display area 508 and moving the "point-and-click" device to create the selected area 510, and/or performing a variety of other "point-and-click" device actions known in the art). In another embodiment, the input device may be a touchscreen that may be used to provide the enhanced area input that selects the selected area 510 using methods known in the art (e.g., by drawing the selected area 510, "reverse pinching" to define the selected area 510, and/or performing a variety of other touchscreen actions known in the art.) While a rectangular-shaped selected area 510 is illustrated in FIG. 5, one of skill in the art will recognize that the selected area 510 may be of any shape (e.g., circular, square, custom-drawn shapes, etc.) while remaining within the scope of the present disclosure.

The selected area 510 is received by the video data transmission engine 302a from the input device 302c. As can be seen in FIG. 5, the selected area 510 includes a first portion of the video image (e.g., the area within the dotted line that defines the selected area 510) that is to be transmitted from the IHS 302 to the IHS 304. Furthermore, the selected area 510 also defines a second portion of the video image, at least some of which is not included in the first portion of the video image (e.g., the area between the solid line that defines the total display area 508 and the dotted line that defines the selected area 510), that is to be transmitted from the IHS 302 to the IHS 304. In an embodiment, the video data transmission engine 302a is operable to store the selected area 510 in a memory (e.g., the system memory 114 discussed above with reference to FIG. 1). For example, the video data transmission engine 302a may store positioning data that describes the relative position of the selected area 510 and the total display area 508. In one embodiment, the first portion of the video image may be the area within the dotted line that defines the selected area 510, and the second portion of the video image may be the area between the solid line that defines the total display area 508 and the dotted line that defines the selected area 510. In another embodiment, the first portion of the video image may be the area within the dotted line that defines the selected area 510, and the second portion of the video image may be the entire area within the solid line that defines the total display area 508 (and that includes the first portion.)

In another embodiment, the selected area 510 may be provided to the video data transmission engine 302a in the IHS 302 from an input device in an IHS that is connected to the IHS 302 over a network. For example, the enhanced area selection screen 500 illustrated on the display 504 of the IHS 500 may be presented to a user on the display 304e of the IHS 304. The user of the IHS 304 may select the selected area 510 in substantially the same manner as described above for the user of the IHS 302, and the selected area 510 may then be sent over the network (e.g., the network 202) and received by the video data transmission engine 302a in the IHS 302. The embodiment in which the selected area 510 is received over the network may be useful for both video conferencing (e.g., when the video receiving IHS wishes to define the enhanced area 510 to be transmitted), the "one-way" transmittal of stored video from the IHS 302 to the IHS 304, and/or a variety of other video transmission situations known in the art.

Figure 6:
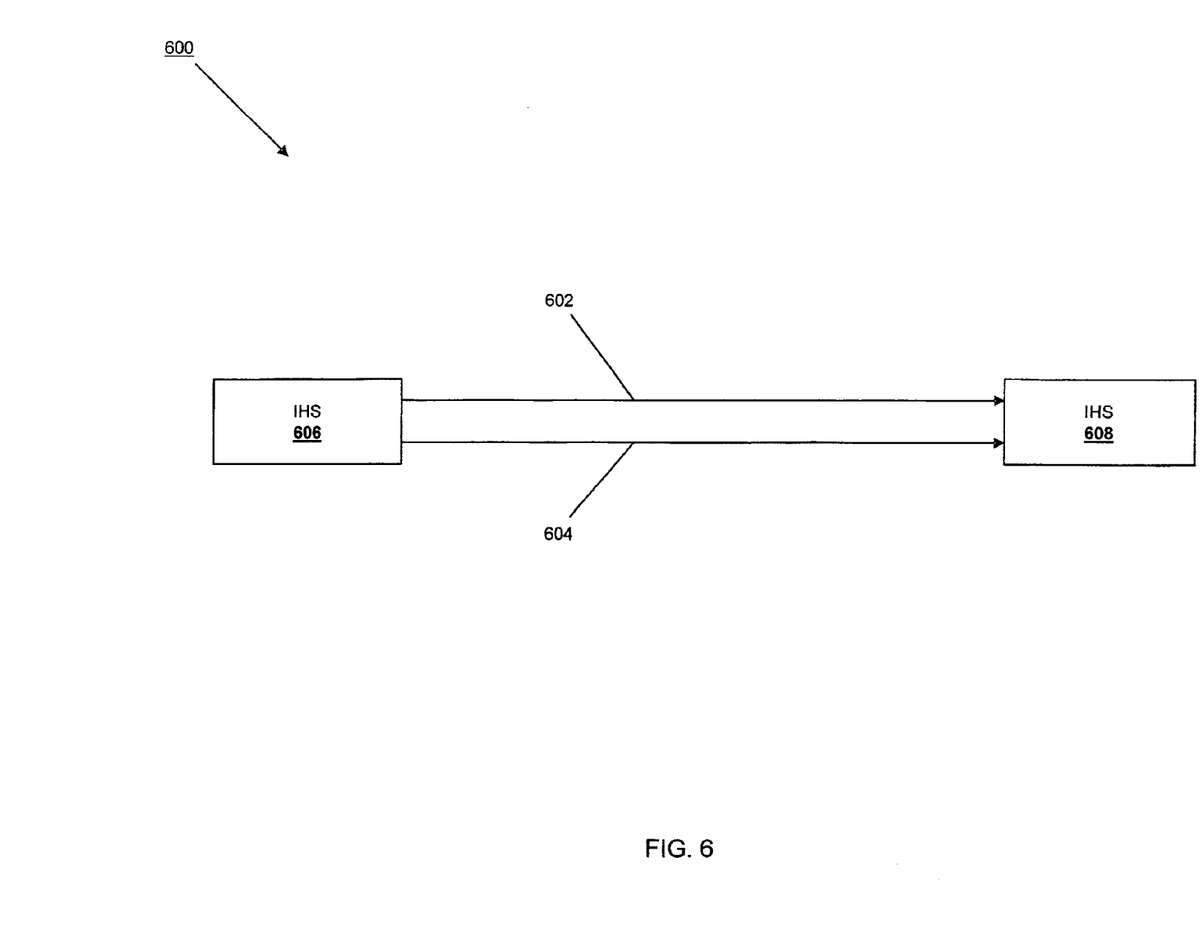
FIG. 6 is a schematic view illustrating an embodiment of video being transmitted between IHSs.

Referring now to FIGS. 3, 4, and 6, the method 500 proceeds to blocks 404 and 406 where the first portion of the video image is transmitted at a first video characteristic and the second portion of the video image is transmitted at a second video characteristic. FIG. 6 illustrates the transmission of the first portion 602 of the video image and the second portion 604 of the video image from an IHS 606 to an IHS 608. In an embodiment the IHS 606 may be the IHS 302, described above with reference to FIG. 3, and the IHS 608 may be the IHS 304, described above with reference to FIG. 3. In an embodiment, the first portion 602 of the video image may coincide with the area within the dotted line that defines the selected area 510 in FIG. 5, and the second portion of the video image may coincide with the area between the solid line that defines the total display area 508 and the dotted line that defines the selected area 510 in FIG. 5. In another embodiment, the first portion 602 of the video image may coincide with the area within the dotted line that defines the selected area 510, and the second portion of the video image may coincide with the entire area within the solid line that defines the total display area 508 (and thus also coincides with the area within the dotted line that defines the selected area 510 in FIG. 5.) In an embodiment, along with the first portion 602 and the second portion 604 of the video image, metadata may be transmitted from the IHS 606 to the IHS 608 that includes positioning data for the first portion 602 of the video image relative to the second portion 604 of the video image (e.g., positioning data that describes the position of the selected area 510 relative to the total display area 508, discussed above with reference to FIG. 5).

In one example, a video characteristic at which the first portion 602 and the second portion 604 of the video image are transmitted may be resolution. Thus, the first portion 602 of the video image may be transmitted by the video data transmission engine 302a at a first resolution, and the second portion 604 of the video image may be transmitted by the video data transmission engine 302a at a second resolution that is lower than the first resolution. For example, the first resolution may include more pixels per inch than the second resolution such that the first portion 602 of the video image is of a higher quality than the second portion of the video image due to the first portion 602 of the video image being operable, when displayed on a display, to provide more detail than the second portion 604 of the video image.

In another example, a video characteristic at which the first portion 602 and the second portion 604 of the video image are transmitted may be frame rate. Thus, the first portion 602 of the video image may be transmitted by the video data transmission engine 302a at a first frame rate, and the second portion 604 of the video image may be transmitted by the video data transmission engine 302a at a second frame rate that is lower than the first frame rate. For example, the first frame rate may include more frames per second (e.g., 30-60 FPS) than the second frame rate (e.g., <30 FPS) such that the first portion 602 of the video image is of a higher quality than the second portion of the video image, due to the first portion 602 of the video image being operable, when displayed on a display, to update each video image frame more quickly than the second portion 604 of the video image.

In another example, a video characteristic at which the first portion 602 and the second portion 604 of the video image are transmitted at may be compression. Thus, the first portion 602 of the video image may be provided a first compression and transmitted by the video data transmission engine 302a, and the second portion 604 of the video image may be provided a second compression, which is greater than the first compression, and transmitted by the video data transmission engine 302a. One of skill in the art will recognize that the greater compression of the second portion 604 of the video image relative to the first portion 602 of the video image will result in the first portion 602 of the video image being of a higher quality than the second portion of the video image, due to the first portion 602 of the video image being operable, when displayed on a display, to be uncompressed with less video data loss relative to the second portion 604 of the video image.

Furthermore, the video characteristic at which the first portion 602 and the second portion 604 of the video image are transmitted may include a plurality of video characteristics that, in a embodiment, include combinations of resolution, frame rate, compression, and/or a variety of other video characteristics known in the art. Thus, the first portion 602 of the video image may be transmitted at a higher resolution, a higher frame rate, and a lower compression relative to the resolution, frame rate, and compression at which the second portion 604 of the video image is transmitted.

In an embodiment, the video data transmission engine 302a is operable to determine a transmission bandwidth for the transmission of video data between the IHS 606 and the IHS 608 over the network 202. The transmission bandwidth may then be used to adjust a difference between the first video characteristic (at which the first portion 602 of the video image is transmitted) and the second video characteristic (at which the second portion 604 of the video image is transmitted.) For example, the video data transmission engine 302a may first determine the transmission bandwidth available for the transmission of video data between the IHSs 606 and 608, then determine the second video characteristic at which the second portion 604 of the video image should be transmitted in order to provide a minimum quality, and then determine the first video characteristic at which the first portion 602 of the video image should be transmitted in order to provide the maximum quality possible using the remaining transmission bandwidth available when transmitting the second portion 604 of the video image to provide the minimum quality. For example, the video data transmission engine 302a may adjust the difference between the resolution of the first portion 602 and the second portion 604 of the video image, the frame rate of the first portion 602 and the second portion 604 of the video image, and/or the compression of the first portion 602 and the second portion 604 of the video image in response to determining the video transmission bandwidth between the IHSs 606 and 608. Thus, an overall video image (e.g., the second portion 604) may be complemented by a limited area video image (e.g., the first portion 602) that is transmitted at a higher resolution, and by decreasing the resolution of the overall video image, the resolution of the limited area video image may be proportionally increased while utilizing the same (or less) bandwidth. In another embodiment, the first portion 602 of the video image may be transmitted at the highest possible resolution and/or frame rate available, and/or the lowest possible compression available, while the second portion 604 of the video image may be transmitted at a resolution, frame rate, and/or compression that is accommodated by the transmission bandwidth that remains after transmitting the first portion 602 of the video image. In some situation, the second portion 604 of the video image may not be transmitted and thus eliminated from the video image.

In an embodiment, transmission of the first portion 602 of the video image and the second portion 604 of the video image may be performed by the video data transmission engine 302a using separate data streams. Thus, the video data for the video image may be separated into the first portion 602 of the video image and the second portion 604 of the video image, and the first portion 602 of the video image may be transmitted as a first video data stream while the second portion 604 of the video image may be transmitted as a second video data stream. In an embodiment, conventional industry standard streams such as, for example, Skype®, H264, H263, and/or a variety of other streams may be used to allow compatibility with common systems and transport mechanisms. However, non-standard compression and transmission techniques may allow the video transmission to be further optimized. For example, conventional formats (e.g., Skype®, H264, H26) are all used for transmitting rectangular video images at a uniform compression rate and pixel density, and the use of two video data streams may be incorporated with these convention formats relatively easily. However, a single video data stream could be used to replace the two video data streams in the embodiment above by using a format that is operable to change resolutions during a scan line. This would result in no repeat of the higher definition resolution video data in a lower definition resolution in another stream, and any prioritization could be embedded.

In an embodiment, the video transmission data engine 302a is operable to prioritize the transmission of the first portion 602 of the video image relative to the second portion 604 of the video image. For example, one of skill in the art will recognize that conventional packet tagging (e.g., 802.1p) prioritizes data streams so that high priority data streams experience less packet loss than low priority data streams, and such conventional packet tagging typically prioritizes data as follows: 1. audio, 2. video, and 3. data. In one embodiment, the video transmission data engine 302a is operable to prioritize the first portion 602 of the video image relative to the second portion 604 of the video image such that the first portion 602 of the video image experiences less packet loss than the second portion 604 of the video image. For example, the video transmission data engine 302a may tag packets to provide the following priority: 1. audio, 2. first portion 602 of video, 3. second portion 604 of video, 4. data. Such prioritization will guarantee the first portion 602 of the video a higher quality of service relative to the second portion 604 of the video. In an embodiment, available transmission bandwidth will be used for the higher priority first portion 602 of the video, while the lower priority second portion 604 of the video will receive best effort or lower transmission priority. Furthermore, in some video transmission situations (e.g., where audio is relatively unimportant), packets including the first portion 602 of the video image may be tagged with a higher priority than audio.

Referring now to FIGS. 4, 6, 7, and 8, the method 400 proceeds to block 408 where the transmitted first portion and second portion of the video image are displayed on a display. In the embodiment illustrated in FIG. 6, the video receiving IHS is the IHS 608 which, as discussed above may be the IHS 304 discussed above with reference to FIG. 3. The first portion 602 of the video image and the second portion 604 of the video image transmitted by the video data transmission engine 302a in the IHS 302 are received by the video data reception engine 304d in the IHS 304. The video data reception engine 304d is then operable to display the first portion 602 of the video image and the second portion 604 of the video image on the display 304e. FIGS. 7a and 7b illustrate an IHS 700 including a display 702 that may be the IHS 304 and the display 304e, respectively, of FIG. 3. In an embodiment, the video data reception engine 304d is operable to receive the first portion 602 of the video image, the second portion 604 of the video image, and metadata that includes positioning data for the first portion 602 of the video image relative to the second portion 604 of the video image, from the video data transmission engine 302a, and use the metadata to 'recombine' the first portion 602 of the video image and the second portion 604 of the video image for display. In an embodiment, the first portion 602 of the video image may coincide with the area within the dotted line that defines the selected area 510 in FIG. 5, the second portion of the video image may coincide with the area between the solid line that defines the total display area 508 and the dotted line that defines the selected area 510 in FIG. 5, and the first portion 602 of the video image and the second portion 604 of the video image are 'recombined' by positioning them relative to each other to provide a continuous image, as illustrated in FIGS. 7*a* and 7*b*. In another embodiment, the first portion 602 of the video image may coincide with the area within the dotted line that defines the selected area 510, the second portion of the video image may coincide with the entire area within the solid line that defines the total display area 508 (and thus also coincides with the area within the dotted line that defines the selected area 510 in FIG. 5), and the first portion 602 of the video image and the second portion 604 of the video image are 'recombined' by positioning them relative to each other with the first portion 602 of the video image overlaying the second portion 604 of the video image to provide a continuous image, as illustrated in FIGS. 7*a* and 7*b*.

Figure 7A:
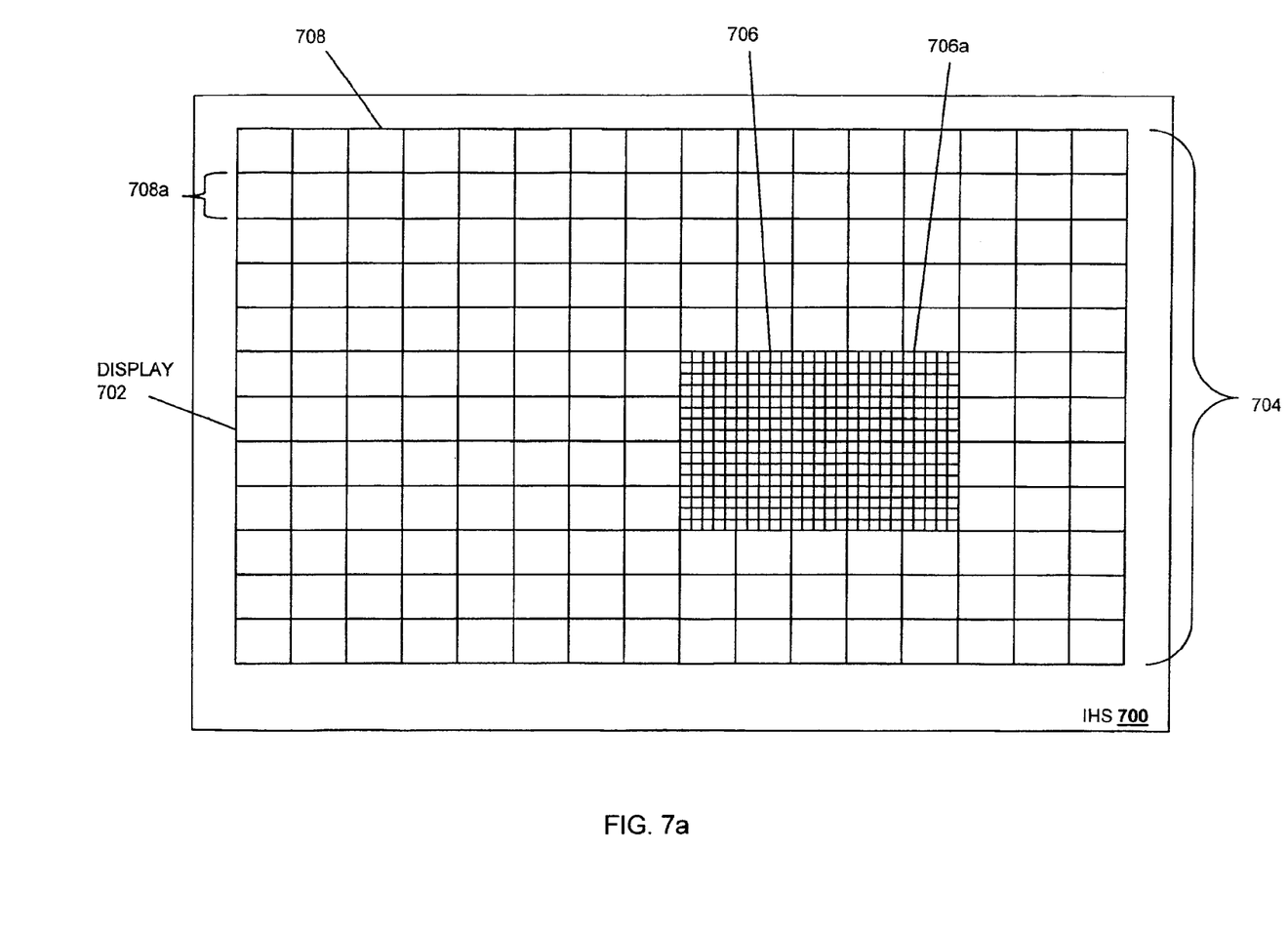
FIG. 7a is a schematic view illustrating an embodiment of a high quality first portion of a video image and a low quality second portion of a video image being displayed on a display.

For example, FIG. 7*a* illustrates a video image 704 that has been recombined and is displayed on a display 702 of an IHS 700. The video image 704 includes a first portion 706 (which may be the first portion 602 of the video image discussed above) that was transmitted at a first video characteristic that included a first resolution, and a second portion 708 (which may be the second portion 604 discussed above) that was transmitted at a second video characteristic that included a second resolution that was lower than the first resolution. For example, as can be seen in the illustrated embodiment, the second portion 708 of the video image 704 is characterized by pixels 708*a* of a first size, while the first portion 706 of the video image 704 is characterized by pixels 706*a* of a second size that is smaller than the first size (e.g., in the illustrated embodiment, each pixel 708*a* is equivalent in size to 20 of the pixels 706*a*.) One of skill in the art will recognize that first portion 706 of the video image 704 will provide a higher quality portion of the video image 704 than the second portion 708 of the video image 704. For example, FIG. 7*b* illustrates an embodiment of the video image 704, which shows how the second portion 708 of the video image 704 includes a low quality (e.g., blurry, pixilated, etc.) relative to the first portion 706 of the video image 704, and allows objects within the first portion 706 of the video image 704 to be seen clearly and with more detail than objects that are within the second portion 708 of the video image 704 but outside the first portion 706 of the video image 704.

Figure 7B:
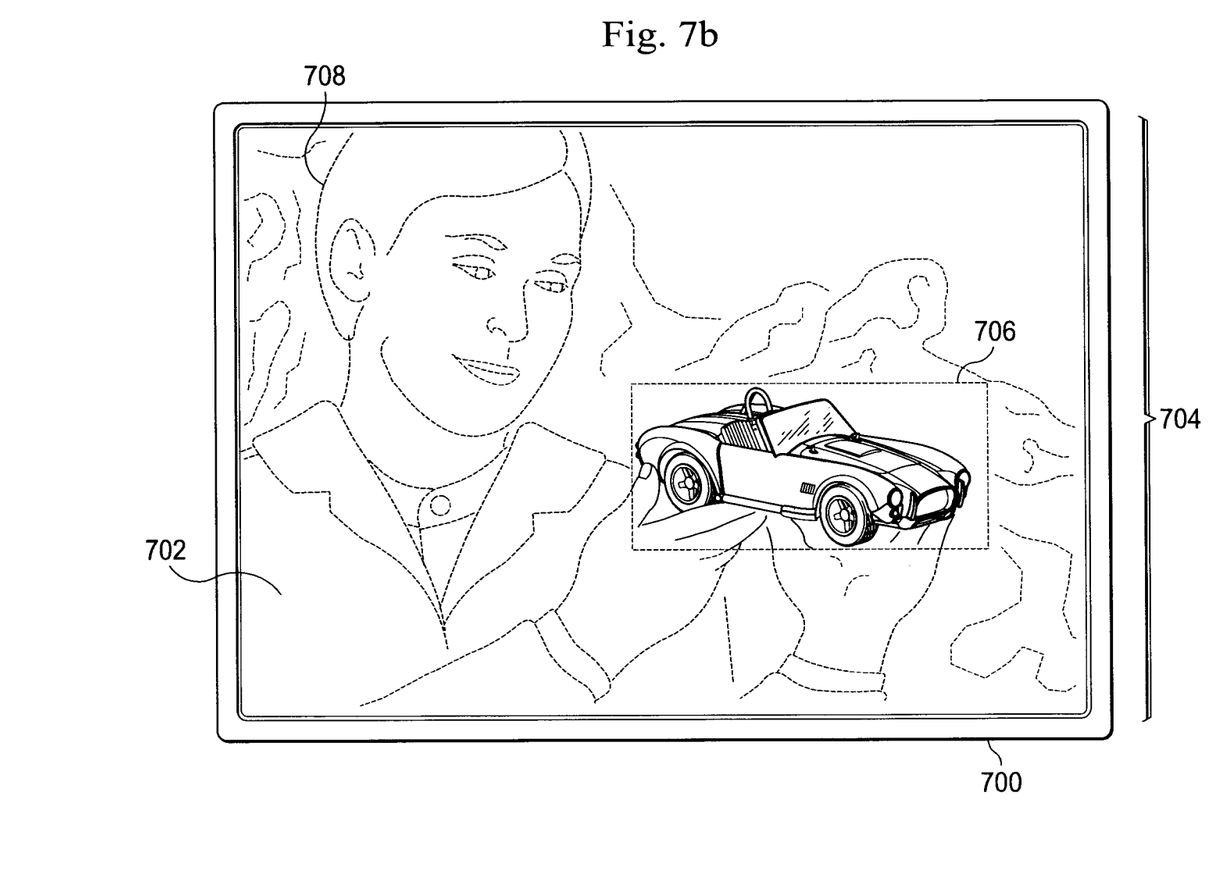
FIG. 7b is a front view illustrating an embodiment of a high quality first portion of a video image and a low quality second portion of a video image being displayed on a display.

While FIGS. 7*a* and 7*b* illustrate a video image 704 including portions 706 and 708 that are transmitted at different resolutions, one of skill in the art will recognize that the first portion 706 and the second portion 708 may have been transmitted at different frame rates to provide the video image 704, different compressions to provide the video image 704, and/or a variety of other video characteristics that are different (between the first portion 706 and the second portion 708) to provide the video image 704. Furthermore, the video image 704 may include the portions 706 and 708 transmitted with combinations of different resolutions, frame rates, compressions, and/or other video characteristics known in the art.

Thus, a video transmission system has been described that may conserve transmission bandwidth between IHSs by separating the video image being transmitted into a first portion of the video image that is of interest to the viewers, and a second portion of the video image that is relatively uninteresting to the viewers. The first portion of the video image is transmitted at a higher quality video characteristic than the second portion of the video image. A selected area that indicates an area of importance in the video image may be provided by either of the video transmitting IHS or the video receiving IHS, and that selected area may then be transmitted as the high quality first portion of the video image such that objects within the selected area are displayed clearly for viewing. In another embodiment, the video transmission system may be used as a security system to obscure objects in the video image that are of a sensitive nature by providing the selected area such that it does not include those sensitive objects. One of skill in the art will recognize how transmission bandwidth available between IHSs may be optimized for viewing the selected area of the video image by decreasing the quality of the second portion of the video image to a minimum quality while increasing the quality of first portion of the video image to the highest quality that can be accommodated by the transmission bandwidth that is available.

Figure 8:
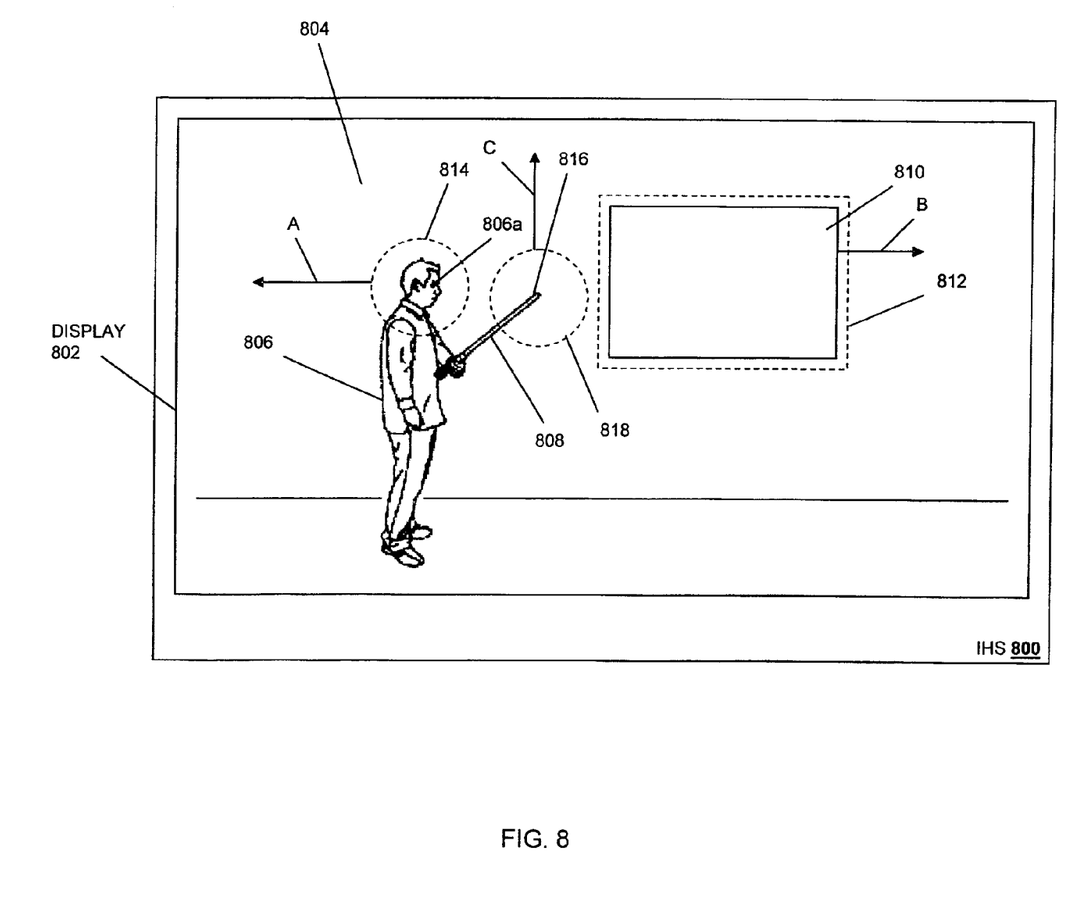
FIG. 8 is a front view illustrating an embodiment of selected areas on a video image.

Referring now to FIGS. 4 and 8, an embodiment of a video transmission is illustrated on an IHS 800 including a display 802 that may be the IHS 302 and display 302*e*, the IHS 304 and display 304*e*, the IHS 606, and/or the IHS 608, and may operate according to the method 400. In the illustrated embodiment, a video image 804 is being displayed on the display 802 that includes a person 806 holding a pointer 808 and located adjacent an information screen 810. In one example, at block 402 of the method 400, the video image 804 may be provided on the display 302*b* by the camera 302*b* in the IHS 302, and the user of the IHS 302 may provide an enhanced area input that selects a selected area 812 that includes the information screen 810. As discussed above, the video image 804 will then be transmitted from the IHS 302 to the IHS 304 such that the video image 804 may be displayed on the IHS 304 with the information screen displayed at a higher quality than the rest of the video image 804 such that details on the information screen may be recognized by the user of the IHS 304. In an embodiment, the camera 302*b* on the IHS 302 may provide the video image 804 to an object recognition engine that may include instructions located on a non-transitory, computer-readable medium that, when executed by a processor, recognizes the information screen 810 once the selected area 812 is provided around it. The object recognition engine may then be operable to ensure that the information screen remains in the selected area 812 in response to the camera 302*b* moving (e.g., the camera 302*b* on the IHS 302 may move, causing the information screen 810 to move across the display 802 in a direction B, and the object recognition engine will then cause the selected area 812 to move in the direction B along with the information screen 810 to ensure that the information screen remains in the selected area 812 and thus continues to be displayed in the video image at a high quality.)

In another example, rather than "drawing" the selected area on the video image, an enhanced area input that selects a selected area 814 may be provided using facial recognition technology on the transmitting IHS. For example, the camera 302*b* on the IHS 302 may provide the video image 804 to a facial recognition engine that may include instructions located on a non-transitory, computer-readable medium that, when executed by a processor, result in a face 806*a* on the person 806 being recognized and/or tracked. The facial recognition engine may then use the recognized face 806*a* as the enhanced area input that provides the selected area 814 around the recognized face 806*a*, as illustrated in FIG. 8. As discussed above, the video image 804 will then be transmitted from the IHS 302 to the IHS 304 such that the video image 804 may be displayed on the IHS 304 with the face 806a of the person 806 displayed at a higher quality than the rest of the video image 804 such that details on the face 806a of the person 806 may be recognized by the user of the IHS 304. Furthermore, as the person 806 moves, the facial recognition engine is operable to continue to detect and/or track the face 806a such that the selected area 814 may move (e.g., in a direction A) on the video image 804 and continue to display the face 806a of the person 806 at a higher quality than the rest of the video image 804, regardless of where in the video image 804 the person 806 is located.

In another example, a sensor 816 may be provided (e.g., on an end of the pointer 808 in the illustrated embodiment) that provides a selected area 818. The camera 302b on the IHS 302 may then provide the video image 804 to a sensor detector engine that may include instructions located on a non-transitory, computer-readable medium that, when executed by a processor, detects and/or tracks the sensor 816. The sensor detection engine may then use the detected sensor 816 as the enhanced area input that provides the selected area 818 around the end of the pointer 808, as illustrated in FIG. 8. As discussed above, the video image 804 will then be transmitted from the IHS 302 to the IHS 304 such that the video image 804 may be displayed on the IHS 304 with any portion of the video image 804 that is adjacent the end of the pointer 808 displayed at a higher quality than the rest of the video image 804 such that details of the portion of the video image 804 that are adjacent the end of the pointer 808 may be recognized by the user of the IHS 304. Furthermore, as the end of the pointer 808 moves, the sensor detector engine is operable to continue to detect and/or track the sensor 816 such that the selected area 818 may move (e.g., in a direction C) on the video image 804 and continue to display the portion of the video image 804 that is adjacent the end of the pointer 808 at a higher quality than the rest of the video image 804, regardless of where in the video image 804 the sensor is located.

While a plurality of embodiments of selected inputs are illustrated and described with reference to FIG. 8, one of skill in the art will recognize that modification of the selected inputs will fall within the scope of the present disclosure. In an embodiment, multiple selected inputs may be provided such that there are multiple portions of the video image that are transmitted at a higher quality than other portions of the video image. For example, each of the selected inputs 812, 814, and 818 in FIG. 8 may be transmitted as higher quality areas of the video image relative to areas of the video image that are not within the selected inputs 612, 814, and 818, such that the information screen 810, the face 806a of the person 806, and the area of the video adjacent the end of the pointed 808 may be displayed in more detail than the remainder of the video image.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A video transmission system, comprising: a non-transitory, computer-readable medium that is coupled to a network, the non-transitory, computer-readable medium comprising instructions that, when executed by a processor, provide a video data transmission engine that:
   receives a selected area from a user input device, wherein the selected area designates a first portion of a video that is defined by static positioning data relative to a total display area of the video, and wherein the video includes a second portion and at least some of the second portion is not included in the selected area;
   stores the static positioning data that describes the static position of the first portion of the video relative to the total display area of the video;
   transmits each of a plurality of video images that provide the video and that are located in the first portion of the video at a first resolution over the network based on each of the those plurality of video images being located in the first portion of the video that is static relative to the total display area of the video; and
   transmits each of a plurality of video images that provide the video and that are located in the second portion of video at a second resolution over the network, wherein the second resolution is lower than the first resolution.

2. The system of claim 1, wherein the video data transmission engine:
   determines an video transmission bandwidth; and
   adjusts a difference between the first resolution and the second resolution based on the video transmission bandwidth.

3. The system of claim 1, wherein the video data transmission engine:
   prioritizes the transmission of each of the plurality of video images that provide the video and that are located in the first portion of the video over the network relative to the transmission of each of the plurality of video images that provide the video and that are located in the second portion of the video over the network.

4. The system of claim 1, wherein the user input device is directly physically coupled to the computer-readable medium.

5. The system of claim 1, wherein the video data transmission engine:
   receives the selected area from the user input device over the network.

6. The system of claim 1, wherein the video data transmission engine:
   separates each of the plurality of video images that provide the video and are located in the first portion of the video from each of the plurality of video images that provide the video and that are located in the second portion of the video;
   transmits each of the plurality of video images that provide the video and that are located in the first portion of the video in a first video data stream and
   transmits each of the plurality of video images that provide the video and that are located in the second portion of the video in a second video stream.

7. The system of claim 6, wherein the video data transmission engine:
   provides a first compression to the first video data steam; and
   provides a second compression to the second video data stream, wherein the second compression is greater than the first compression.

8. An information handling system, comprising:
   a processor;
   a network interface coupled to the processor;
   a computer-readable medium coupled to the processor, the computer-readable medium comprising instructions that, when executed by the processor, provide a video data transmission engine that:
   receives an enhanced area input from a user input device, wherein the enhanced area input designates a first area of a video that is defined by static positioning data relative to a total display area of the video, and wherein the video includes a second portion and at least some of the second portion is not included in the enhanced area input;

stores the static positioning data that describes the static position of the first portion of the video relative to the total display area of the video;

transmits each of a plurality of video images that provide the video and that are located in the first area of the video at a first resolution over the network based on each of the those plurality of video images being located in the first area of the video that is static relative to the total display area of the video; and transmits each of a plurality of video images that provide the video and that are located in the second area of the video at a second video characteristic over the network through the network interface, wherein the first video characteristic is different from the second video characteristic such that the first area of the video comprises a higher quality than the second area of the video when each of the plurality of video image that provide the video and that are location in the first area and the second area are displayed.

9. The system of claim 8, wherein the video data transmission engine:
determines a transmission bandwidth over a network that is connected to the network interface; and
adjusts a difference between the first video characteristic and the second video characteristic based on the transmission bandwidth.

10. The system of claim 8, wherein the video data transmission engine:
prioritizes the transmission of each of the plurality of video images that provide the video and that are located in the first area of the video over the network relative to the transmission of each of the plurality of video images that provide the video and that are located in the second area of the video over the network.

11. The system of claim 8, wherein the user input device is directly physically coupled to the processor.

12. The system of claim 8, wherein the video data transmission engine:
receives the enhanced area input from the user input device through the network interface over the network.

13. The system of claim 8, wherein the video data transmission engine:
separates each of the plurality of video images that provide the video and are located in the first portion of the video from each of the plurality of video images that provide the video and that are located in the second portion of the video;
transmits each of the plurality of video images that provide the video and that are located in the first portion of the video in a first video data stream and
transmits each of the plurality of video images that provide the video and that are located in the second portion of the video in a second video stream.

14. The system of claim 8, wherein the first video characteristic is at least one of a resolution of the first area of the video, a frame rate of the first area of the video, and a compression of the first area of the video, and wherein the second video characteristic is at least one of a resolution of the second area of the video, a frame rate of the second area of the video, and a compression of the second area of the video.

15. A method for transmitting video, comprising:
receiving a selected area from a user input device, wherein the selected area designates a first portion of a video received from a video device that is defined by static positioned data relative to total and wherein the video includes a second portion and at least some of the second portion is not included in the selected area;
storing the static positioning data that describes the static position of the first portion of the video relative to the total display area of the video;
transmitting each of a plurality of video images that provide the video and that are located in the first portion of the video at a first resolution over the network for display on a display device based on each of those plurality of video images being located in the first portion of the video that is static relative to the total display area of the video; and
transmitting each of a plurality of video images that provide the video and that are located in the second portion of video at a second resolution over the network, wherein the second resolution is lower than the first resolution.

16. The method of claim 15, further comprising:
determining a transmission bandwidth over the network to the display device; and
adjusting a difference between the first resolution and the second resolution based on the transmission bandwidth.

17. The method of claim 15, further comprising:
prioritizing the transmission of each of the plurality of video images that provide the video and that are located in the first portion of the video image over the network relative to the transmission of each of the plurality of video images that provide the video and that are located in the second portion of the video image over the network.

18. The method of claim 15, further comprising:
separating each of the plurality of video images that provide the video and that are located in the first portion of the video from each of the plurality of video images that provide the video and that are located in the second portion of the video;
transmitting each of the plurality of video images that provide the video and that are located in the first portion of the video in a first video data stream; and
transmitting each of the plurality of video images that provide the video and that are located in the second portion of the video in a second video data stream.

19. The method of claim 18, further comprising:
providing a first compression to the first video data steam; and
providing a second compression to the second video data stream, wherein the second compression is greater than the first compression.

20. The method of claim 15, wherein the selected area is received from the user input device either over the network or through a direct physical connection to an information handling system that performs the method.

* * * * *